(12) United States Patent
Watarai

(10) Patent No.: US 8,539,856 B2
(45) Date of Patent: Sep. 24, 2013

(54) BICYCLE SHIFT CONTROL DEVICE

(75) Inventor: Etsuyoshi Watarai, Izumi (JP)

(73) Assignee: Shimano, Inc., Sakai (JP)

( * ) Notice: Subject to any disclaimer, the term of this patent is extended or adjusted under 35 U.S.C. 154(b) by 1033 days.

(21) Appl. No.: 12/210,542

(22) Filed: Sep. 15, 2008

(65) Prior Publication Data

US 2009/0139361 A1    Jun. 4, 2009

(30) Foreign Application Priority Data

Nov. 29, 2007  (EP) .................................... 07023176

(51) Int. Cl.
*B62M 25/04*    (2006.01)
(52) U.S. Cl.
USPC ........................................................ 74/502.2
(58) Field of Classification Search
USPC .............. 74/473.14, 473.15, 488, 489, 501.6, 74/502.2
IPC ...................................................... B62M 25/04
See application file for complete search history.

(56) References Cited

U.S. PATENT DOCUMENTS

| | | | | |
|---|---|---|---|---|
| 3,972,247 | A * | 8/1976 | Armstrong ....................... | 74/489 |
| 4,002,350 | A * | 1/1977 | Timbs ............................ | 280/236 |
| 5,400,675 | A | 3/1995 | Nagano | |
| 5,848,555 | A | 12/1998 | Watarai | |
| 6,647,823 | B2 | 11/2003 | Tsumiyama et al. | |
| 7,665,384 | B2 * | 2/2010 | Sato et al. ..................... | 74/502.2 |
| 2002/0139637 | A1 * | 10/2002 | Tsumiyama et al. ......... | 192/217 |
| 2006/0207375 | A1 | 9/2006 | Jordan et al. | |
| 2006/0272443 | A1 * | 12/2006 | Tsumiyama .................. | 74/502.2 |
| 2008/0196537 | A1 * | 8/2008 | Dal Pra' ....................... | 74/502.2 |
| 2008/0295638 | A1 * | 12/2008 | Miki et al. ................... | 74/502.2 |

FOREIGN PATENT DOCUMENTS

| | | |
|---|---|---|
| EP | 1535829 A2 | 6/2005 |
| EP | 1698550 A1 | 9/2006 |
| EP | 1739001 A1 | 1/2007 |
| EP | 1787903 A1 | 5/2007 |
| EP | 1955937 A2 | 8/2008 |

(Continued)

OTHER PUBLICATIONS

European search report for EP 07023176.6, the European application that corresponds to this application, dated May 14, 2008.

(Continued)

*Primary Examiner* — Thomas Diaz
(74) *Attorney, Agent, or Firm* — James A. Deland

(57) ABSTRACT

A bicycle shift control device comprises a base member, a shift control unit movable in a first direction and in a second direction, and an operating member operatively coupled to the shift control unit. The operating member is coupled relative to the base member to move along a shift operating path from a rest position to a first shift position for causing movement of the shift control unit in the first direction, and the operating member is coupled relative to the base member to move along the shift operating path from the rest position to a second shift position for causing movement of the shift control unit in the second direction, wherein the first shift position is located between the rest position and the second shift position. The operating member is coupled relative to the base member to move along a brake operating path that is non-coincident with the shift operating path, and the operating member has a finger contact portion that the user contacts to move the operating member along the brake operating path.

10 Claims, 7 Drawing Sheets

(56) References Cited

FOREIGN PATENT DOCUMENTS

| | | | |
|---|---|---|---|
| EP | 1739001 | B1 | 12/2008 |
| FR | 2861686 | A1 | 5/2005 |
| WO | 2007083331 | A1 | 7/2007 |

OTHER PUBLICATIONS

European Notice of Opposition for EP 2065298, the European application that corresponds to this application, dated Jul. 13, 2012.

* cited by examiner

BICYCLE SHIFT CONTROL DEVICE

BACKGROUND OF THE INVENTION

The present invention is directed to bicycle control devices and, more particularly, to a bicycle shift control device that has an operating member that moves in a shift operating direction and in a direction other than a shift operating direction.

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices used for performing shifting and braking operations.

Typically, bicycle shift control devices mechanically operate derailleurs via cables, and bicycle brake control devices mechanically operate brake devices via cables. In either case, an operating force is typically applied by one of the rider's fingers to operate a control lever, and the operating force is transmitted to the actuating component of the bicycle derailleur or to the actuating component of the brake device by a cable that is fixed to the control lever and to the actuating component.

Currently, many different types of control devices exist for performing shifting and braking operations. One example of such a control device is disclosed in U.S. Patent Application Publication No. 2006/0207375. That publication discloses a brake control device integrated with a shift control device. More specifically, a shift control unit is disposed inside of a base member of the brake control device, and a shift operating lever is disposed behind a brake operating lever. When the shift operating lever is pivoted laterally inwardly by a first stroke amount, a shift control wire releasing operation is performed. When the shift operating lever is pivoted in the same direction by a second stroke amount which is greater than the first stroke amount, a shift control wire pulling operation is performed. While the device can perform both wire releasing and wire pulling operations using a single shift operating lever, the close positioning of the shift operating lever and the brake operating lever can confuse some riders. This is especially true during competitive racing when the rider must operate the shift operating lever while simultaneously looking at the road and at other riders. In such situations, the rider may reach too far and may mistakenly attempt to push the brake operating lever laterally inwardly. Since the brake operating lever does not move laterally, the rider quickly becomes distracted when he or she realizes that a mistake has been made. The rider then must concentrate on adjusting his or her fingers around the brake operating lever and to the back of the brake lever to ensure that the fingers properly contact the shift operating lever. During this time, valuable concentration on the race is lost. Even worse, the distraction may cause the rider to miss a shift of otherwise cause the bicycle to slow down against the rider's intention and cause the rider to lose the race.

SUMMARY OF THE INVENTION

The present invention is directed to various features of a bicycle control device. In one embodiment, a bicycle shift control device comprises a base member, a shift control unit movable in a first direction and in a second direction, and an operating member operatively coupled to the shift control unit. The operating member is coupled relative to the base member to move along a shift operating path from a rest position to a first shift position for causing movement of the shift control unit in the first direction, and the operating member is coupled relative to the base member to move along the shift operating path from the rest position to a second shift position for causing movement of the shift control unit in the second direction, wherein the first shift position is located between the rest position and the second shift position. The operating member is coupled relative to the base member to move along a brake operating path that is non-coincident with the shift operating path, and the operating member has a finger contact portion that the user contacts to move the operating member along the brake operating path. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
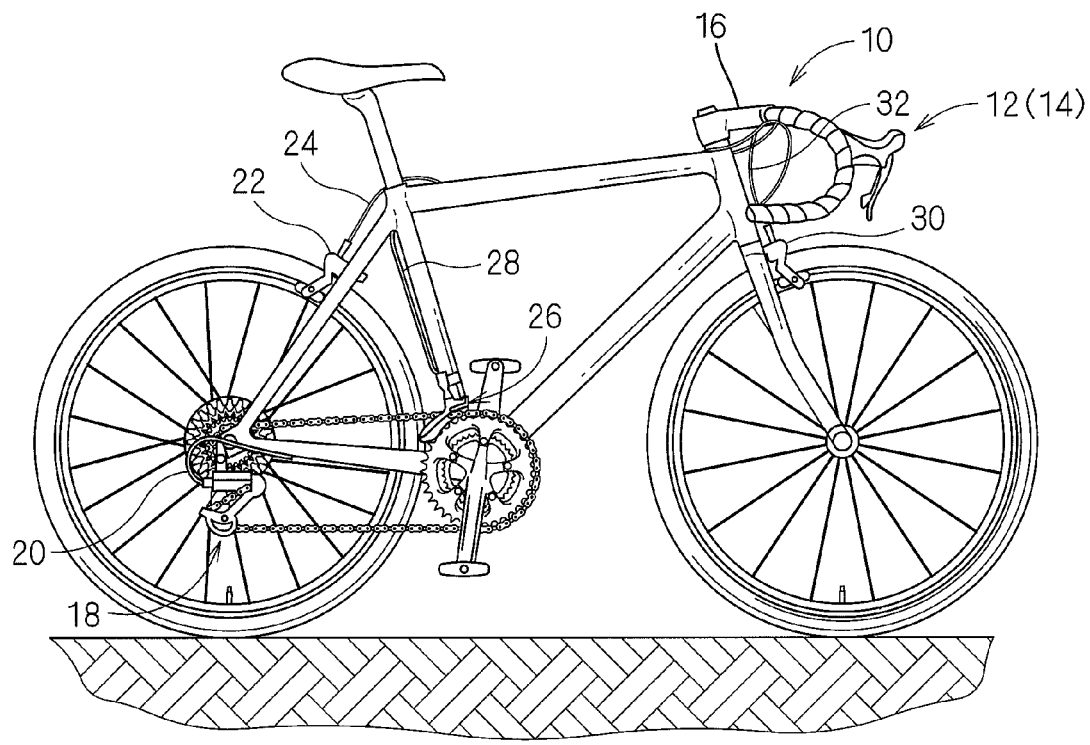
FIG. 1 is a side view of a bicycle that is equipped with particular embodiments of bicycle control devices.
Figure 2:
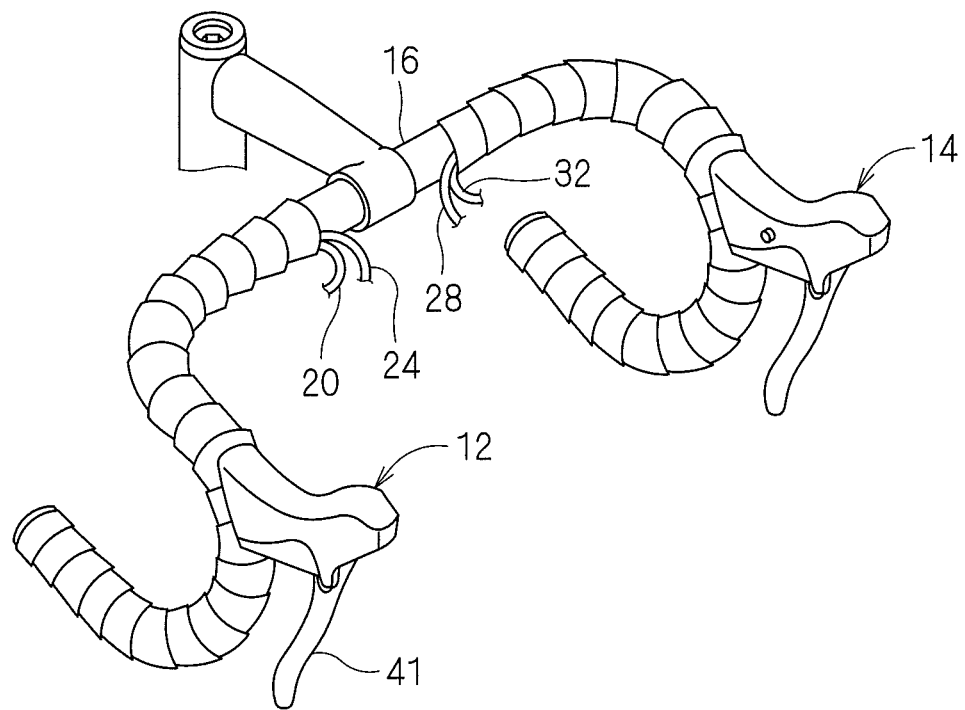
FIG. 2 is a more detailed view of the bicycle handlebar assembly.

FIG. 1 is a side view of a bicycle 10 that is equipped with particular embodiments of bicycle control devices 12 and 14 mounted on a bicycle handlebar assembly 16, and FIG. 2 is a more detailed view of bicycle handlebar assembly 16. As shown in FIGS. 1 and 2, bicycle control device 12 is a right-hand-side control device operated by the rider's right hand, while bicycle control device 14 is a left-hand-side control device operated by the rider's left hand. In this embodiment, bicycle control device 12 is operatively coupled to a rear derailleur 18 through a shift control cable 20 and is operatively coupled to a rear brake device 22 through a brake control cable 24. Similarly, bicycle control device 14 is operatively coupled to a front derailleur 26 through a shift control cable 28 and is operatively coupled to a front brake device 30 through a brake control cable 32. In another embodiment, the positions of bicycle control devices 12 and 14 can be switched so that the rider can operate rear derailleur 18 and front derailleur 26 (or rear brake device 22 and front brake device 30) with opposite hands. Preferably, cables 20, 24, 28 and 32 are conventional Bowden-type control cables that have an outer casing the surrounds and covers an inner wire. In this embodiment, left-hand-side bicycle control device 14 is substantially identical to right-hand-side bicycle control device 12, wherein the shifting unit described below has been modified to reduce the number of gears that can be shifted, and left-hand-side bicycle control device 14 is a mirror image of right hand side bicycle control device 12. Because of the similar construction, only right-hand-side bicycle control device 12 will be discussed and illustrated herein.

As shown in FIGS. 3-6, bicycle control device 12 includes a base member 36 in the form of a bracket member, a shift control unit SU, a control member 40, and an operating member in the form of an operating lever 41. Shift control unit SU is substantially the same as the shift control unit disclosed in U.S. Patent Application Publication No. 2006/0207375. Therefore, shift control unit SU will not be discussed in detail. Shift control unit SU is pivotally mounted to base member 36 through an axle 44 that defines an operational shift pivot axis SA of shift control unit SU. During operation, shift control unit SU moves in a first direction and in a second direction opposite to the first direction. More specifically, shift control unit SU is a cable operating device that includes a wire takeup member 51 that is attached to the inner wire of shift control cable 20 to selectively pull and release the inner wire in response to the operation of operating lever 41.

Base member 36 includes a main body having a first end section 36a and a second end section 36b disposed away from first end section 36a. A handlebar mounting structure 43 that includes a handlebar receiving area A is mounted to first end section 36a for fixedly mounting base member 36 to handlebar 16. Handlebar mounting structure 43 may be a conventional band clamp or any other structure that satisfactorily attaches base member 36 to handlebar 16.

Operating lever 41 is located at second end section 36b of base member 36. In this embodiment, operating lever 41 is configured and arranged to perform a braking operation and to cause shift control unit SU to perform wire pulling and releasing operations. For that purpose, operating lever 41 includes a mounting part 41a and an operating part 41b. For the braking operation, an inner wire 24a (FIG. 6) of brake control cable 24 cable is coupled to operating lever 41 through a cable retaining structure 41f disposed on mounting part 41a. Alternatively, inner wire 24a could be fixed directly to mounting part 41a. For the shifting operation, operating lever 41 is operatively coupled to shift control unit SU through operating part 41b and control member 40, wherein control member 40 causes wire takeup member 51 to rotate around axle 44 in the wire pulling and releasing directions. As a result of this structure, bicycle control device 12 forms a single integrated unit that can perform either a braking operation or a shifting operation.

Figure 3:
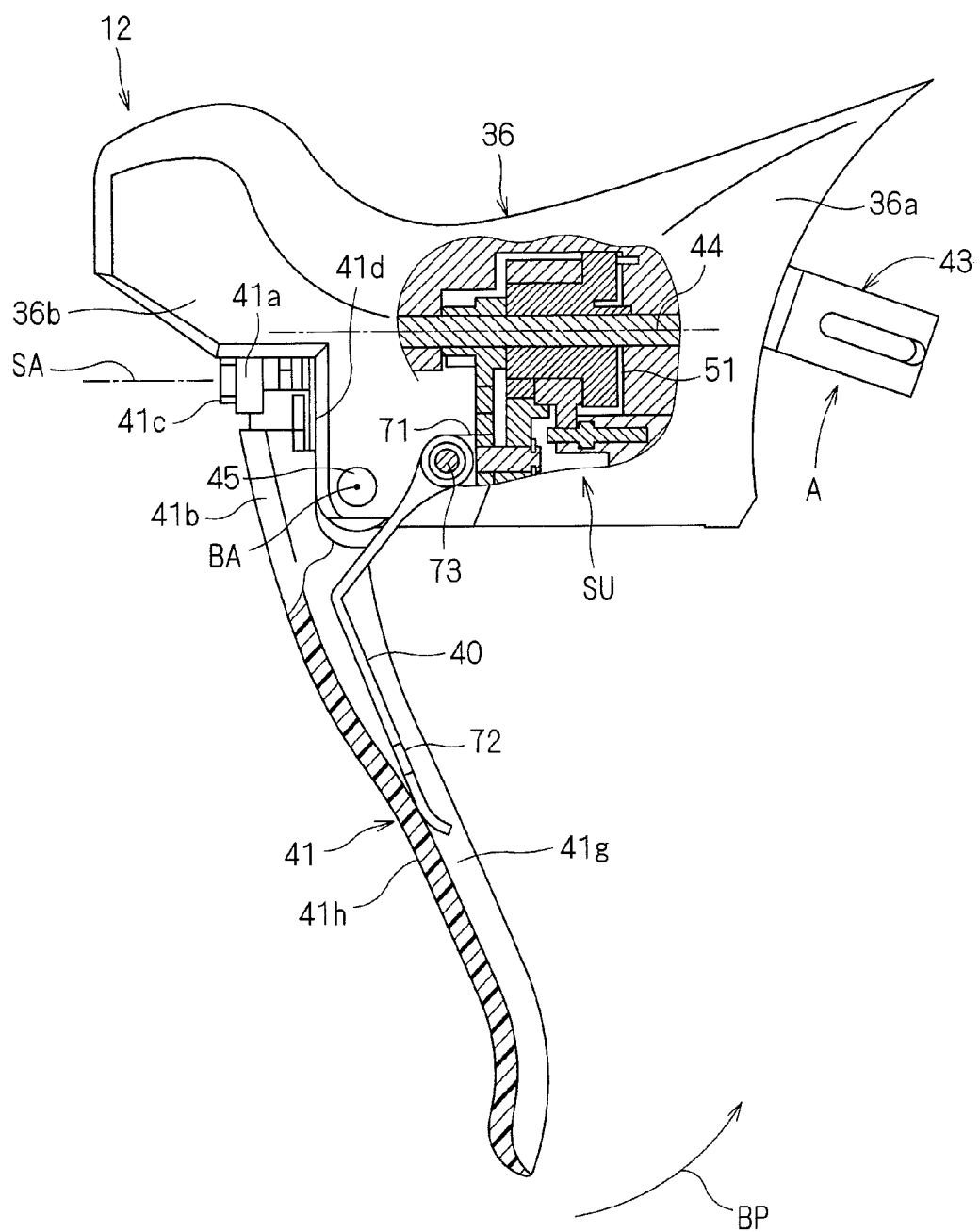
FIG. 3 is a partial cut-away view of the right-hand-side bicycle control device.
Figure 4:
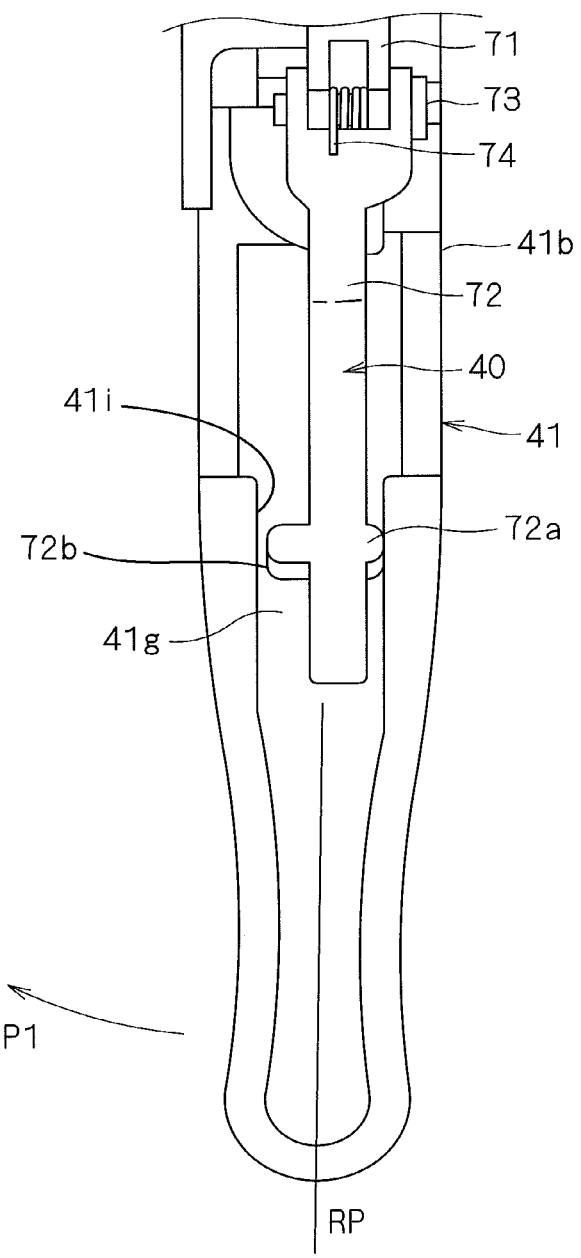
FIG. 4 is a rear view of the bicycle control device.

Mounting part 41a of operating lever 41 is pivotally coupled to base member 36 through a pivot pin 45 so that mounting part 41a pivots relative to base member 36 around a brake pivot axis BA to perform the braking operation. Operating part 41b includes a finger contact portion 41h for moving operating lever 41 along a brake operating plane or path BP. Operating part 41b also includes a concave portion 41g opposite to finger contact portion 41h for receiving control member 40 therein as shown in FIGS. 3 and 4.

Operating part 41b of operating lever 41 is pivotally coupled to mounting part 41a through a pivot pin 41c so that operating part 41b pivots relative to mounting part 41a around shift pivot axis SA. Operating part 41b is biased around pivot pin 41c (clockwise in FIG. 4) to a rest position RP by a biasing element 41d in the form of a torsion spring, and a ball-and-recess type positioning mechanism 41e (FIG. 6) is coupled to mounting part 41a to maintain operating part 41b in the rest position RP. As a result of this structure, operating part 41b is coupled relative to base member 36 to move along a shift operating plane or path P1 and is coupled relative to base member 36 to move along brake operating plane or path BP (a non-shift operating path) that is non-coincident with shift operating plane or path P1. In this embodiment, brake operating plane or path BP of operating lever 41 is oriented perpendicular to shift operating plane or path P1, but clearly other orientations are possible.

Figure 5:
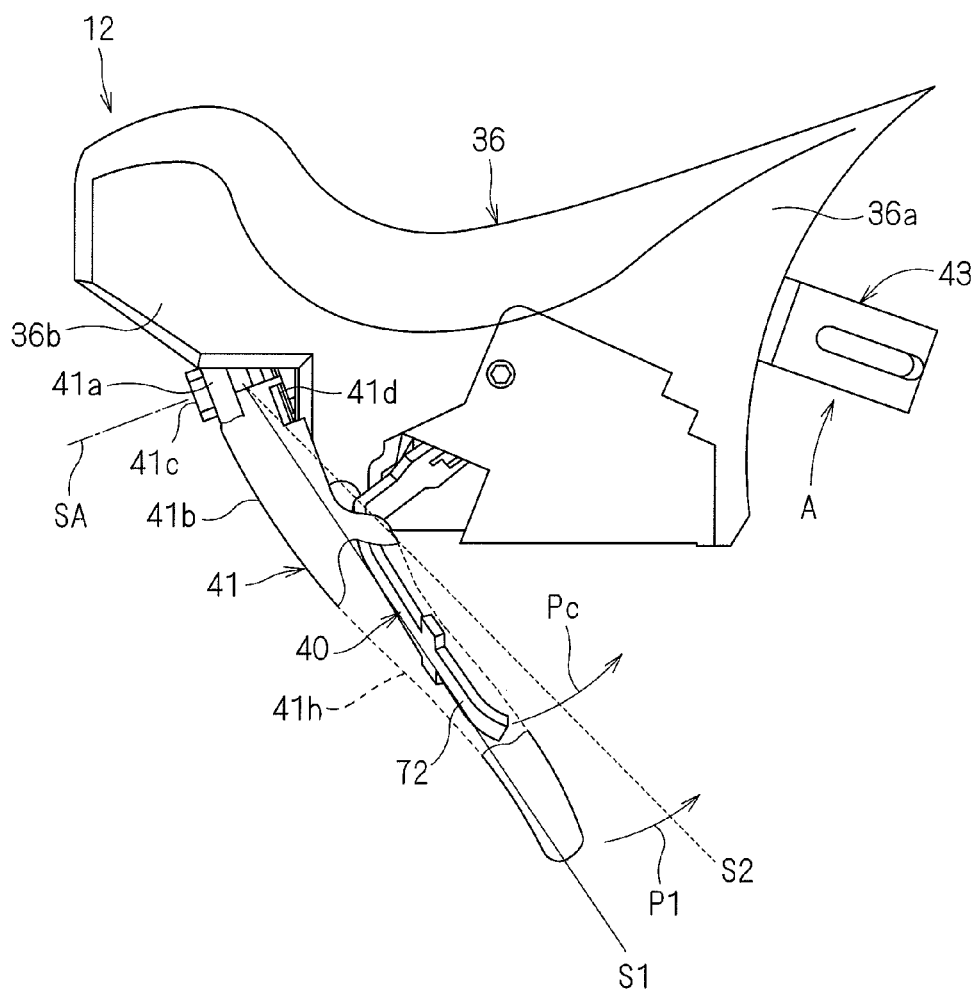
FIG. 5 is a side view of the bicycle control device showing movement of an operating lever along a shift operating path.

Control member 40 has a first portion 71 and a second portion 72. First portion 71 is coupled to second portion 72 through a hinge pin 73, and first portion 71 is coupled to shift control unit SU so that control member 40 can rotate around axle 44 to move along an operating plane or path Pc (FIG. 5). In this embodiment, operating plane or path Pc intersects brake operating plane or path BP of operating lever 41 and is parallel to shift operating plane or path P1 of operating lever 41. Of course, non-parallel orientations are also possible.

Figure 6:
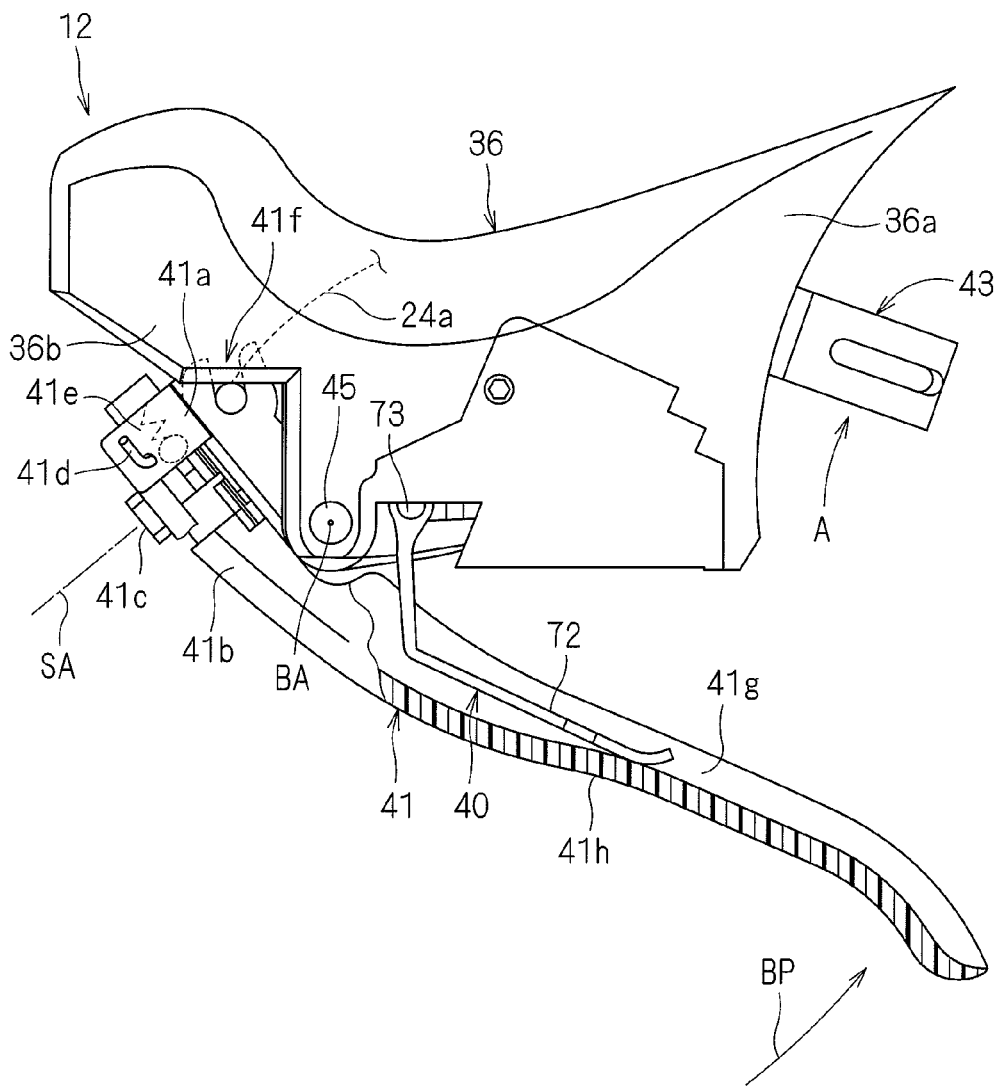
FIG. 6 is a side view of the bicycle control device showing movement of the operating lever along a brake operating path.

In this embodiment, second portion 72 of control member 40 extends downwardly from hinge pin 73 and is disposed in concave portion 41g of operating lever 41. Second portion 72 slidably contacts the rear surface of operating part 41b of operating lever 41. A biasing element 74 (FIG. 4) in the form of a torsion spring is mounted on hinge pin 73 to bias second portion 72 forwardly to a rest position with respect to first portion 71. Hinge pin 73 allows second portion 72 to pivot rearwardly with respect to first portion 71 when operating lever 41 is moved from the rest (non-braking) position shown in FIG. 3 to the braking position shown in FIG. 6. More specifically, when operating lever 41 moves along brake operating plane or path BP, operating lever 41 engages second portion 72 of control member 40 so that second portion 72 rotates around hinge pin 73 and slides relative to operating lever 41 as shown in FIGS. 3 and 6. Second portion 72 includes a projection 72a (FIG. 4) for reducing frictional forces during this sliding movement. Projection 72a also forms an abutment 72b that contacts an abutment 41i formed by concave portion 41g of operating lever 41 so that control member 40 and operating lever 41 rotate together as a unit when operating lever 41 moves along shift operating plane or path P1.

The operation of control device 12 will now be described with reference to FIGS. 3-6. To perform a braking operation, the rider presses against finger contact portion 41h of operating lever 41 to rotate operating lever 41 counterclockwise around pivot pin 45 and brake pivot axis BA. Operating lever 41 moves along brake operating path or plane BP from the rest position shown in FIG. 3 to the braking position shown in FIG. 6, and mounting part 41a of operating lever 41 pulls inner wire 24a of brake control cable 24 to operate rear brake device 22. During that time, operating part 41b of operating lever 41 presses against second portion 72 of control member 40. As a result, second portion 72 of control member 40 rotates around hinge pin 73 and slides along concave portion 41g of operating part 41b so that second portion 72 also moves along brake operating path or plane BP.

To perform a wire releasing operation, the rider pushes operating lever 41 to move laterally inwardly (transverse to a center plane of base member 36) along shift operating plane or path P1 from rest position RP shown in FIG. 4 to a first shift position S1 shown in FIG. 5. During that time, abutment 41i on operating lever 41 presses against abutment 72b on control member 40 to move control member 40 along shift operating plane or path Pc from rest position RP shown in FIG. 4 to first shift position SI shown in FIG. 5. Thus, operating lever 41 and control member 40 rotate together as a unit. Also during that time, control member 40 causes shift control unit SU to rotate wire takeup member 51 around axle 44 and shift pivot axis SA in the wire unwinding direction as discussed in U.S. Patent Application Publication No. 2006/0207375.

To perform a wire winding operation, the rider pushes operating lever 41 to move operating lever 41 laterally inwardly (transverse to a center plane of base member 36) along shift operating plane or path P1 from rest position RP shown in FIG. 4, past first shift position S1 and to a second shift position S2 shown in FIG. 5. During that time, abutment 41*i* on operating lever 41 presses against abutment 72*b* on control member 40 to move control member 40 along shift operating plane or path Pc from rest position RP shown in FIG. 4 to second shift position S2 shown in FIG. 5. Also during that time, control member 40 causes shift control unit SU to rotate wire takeup member 51 around axle 44 and shift pivot axis SA in the wire winding direction as discussed in U.S. Patent Application Publication No. 2006/0207375.

As a result of the structure of control device 12 disclosed herein, a single operating member can be used for both braking and shifting operations in a very ergonomic manner. The rider need not precisely operate a separate control lever disposed adjacent to a brake lever, so the rider can remain focused on his or her performance riding without risking missed shifts or other adverse operation of the bicycle.

Figure 7:
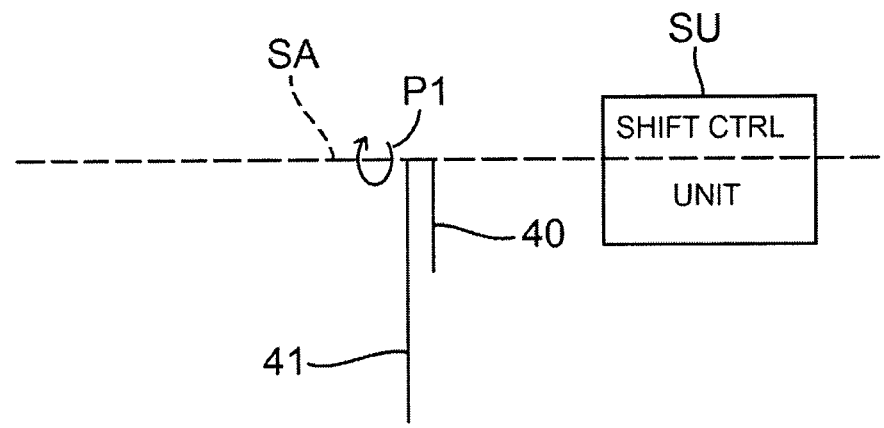
FIG. 7 is a schematic view of an alternative embodiment showing the operating lever and the control member pivoting around a common axis.
Figure 8:
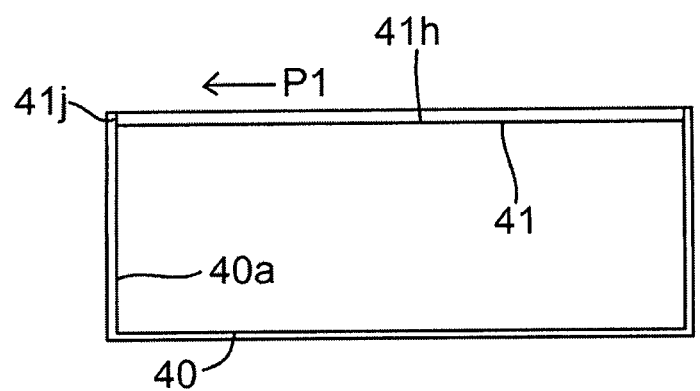
FIG. 8 is a schematic view of an alternative embodiment showing a concave portion of a control member that contacts an abutment on the operating lever to operate a shift control unit.

While the above is a description of various embodiments of inventive features, further modifications may be employed without departing from the spirit and scope of the present invention. For example, while shift control unit SU in the disclosed embodiment was a cable-operated shift control unit, other types of shift control units can be used with bicycle control device 12. Shift control unit SU can be replaced by an electrical shift control unit, a pneumatic shift control unit, a hydraulic shift control unit, or some other type of shift control unit. In the case of an electrical shift control unit, at least first and second electrical switches could be provided for performing respective upshift and downshift operations. While operating lever 41 and control member 40 were arranged to pivot around different but parallel axes to move along the shift operating plane or path, operating lever 41 and control member 40 could be arranged to pivot about a common axis, such as shift pivot axis SA as shown schematically in FIG. 7. Similarly, while operating lever 41 and control member 40 were arranged to pivot around different but parallel axes to move along the brake operating plane or path, operating lever 41 and control member 40 could be arranged to pivot about a common axis, such as brake operating axis BA. While operating lever (41) included concave portion (41*g*) that contacted abutment (72*b*) on control member (40) to operate shift control unit SU, control member (40) could include a concave portion (40*a*) (shown schematically in FIG. 8) that contacts an abutment (41*j*) on operating member (41) to operate shift control unit SU.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle shift control device comprising:
   a base member;
   a shift control unit including a wire takeup member that rotates in a first direction and in a second direction around a rotational axis;
   an operating member including;
      a mounting part pivotally coupled to the base member; and
      an operating part pivotally coupled to the mounting part; and
   a control member including a first portion and a second portion, wherein the first portion is operatively coupled to the shift control unit, and wherein the second portion engages the operating member;
   wherein the operating member is coupled relative to the base member to move along a shift operating path from a rest position to a first shift position for causing the control member to operate the shift control unit for rotation of the wire takeup member in the first direction;
   wherein the operating member is coupled relative to the base member to move along the shift operating path from the rest position to a second shift position for causing the control member to operate the shift control unit for rotation of the wire takeup member in the second direction;
   wherein the first shift position is located between the rest position and the second shift position when viewed along the rotational axis of the wire takeup member;
   wherein the operating member is coupled relative to the base member to move along a brake operating path that is non-coincident with the shift operating path;
   wherein the mounting part of the operating member pivots relative to the base member when the operating member moves along the brake operating path, and wherein the operating part pivots relative to the mounting part when the operating member moves along the shift operating path;
   wherein the operating member includes a retaining structure for a control element that moves to operate a brake;
   wherein the operating member has a finger contact portion that the user contacts to move the operating member along the brake operating path so that the retaining structure moves the control element to operate the brake;
   wherein one of the operating member or the control member has a concave portion opposite to the finger contact portion, wherein the concave portion engages an abutment formed on the other one of the operating member or the control member to move the control member when the operating member moves along the shift operating path;
   wherein the concave portion slidably engages the abutment; and
   wherein the control member slides relative to the operating member when the operating member moves along the brake operating path.

2. The bicycle shift control device according to claim 1 further comprising a biasing unit that biases the second portion of the control member toward engagement with the operating member.

3. The bicycle shift control device according to claim 1 wherein the operating member and the control member pivot when the operating member moves along the shift operating path.

4. The bicycle shift control device according to claim 1 wherein the operating member and the control member pivot when the operating member moves along the brake operating path.

5. The bicycle shift control device according to claim 1 wherein the operating member and the control member pivot about a common axis when the operating member moves along the shift operating path.

6. The bicycle shift control device according to claim 5 wherein the common axis is an operational axis of the shift control unit.

7. The bicycle shift control device according to claim 6 wherein the operational axis is the rotational axis.

8. The bicycle shift control device according to claim 1 wherein the operating member has the concave portion.

9. The bicycle shift control device according to claim 8 wherein the control member is disposed in the concave portion.

10. The bicycle shift control device according to claim 1 wherein the retaining structure is disposed on the mounting part.

* * * * *